United States Patent
Johnson et al.

(10) Patent No.: US 12,486,796 B2
(45) Date of Patent: Dec. 2, 2025

(54) SYSTEMS AND METHODS FOR A HYDROGEN ZERO EMISSIONS VEHICLE

(71) Applicant: NABORS ENERGY TRANSITION SOLUTIONS LLC, Houston, TX (US)

(72) Inventors: Evan Johnson, Spring, TX (US); Dylan Cook, Spring, TX (US); Paul Yollin, Tomball, TX (US); Eli Adler, Olympia, WA (US)

(73) Assignee: NABORS ENERGY TRANSITION SOLUTIONS LLC, Houston, TX (US)

( * ) Notice: Subject to any disclaimer, the term of this patent is extended or adjusted under 35 U.S.C. 154(b) by 0 days.

(21) Appl. No.: 18/447,784

(22) Filed: Aug. 10, 2023

(65) Prior Publication Data

US 2023/0392541 A1 Dec. 7, 2023

Related U.S. Application Data

(63) Continuation of application No. 17/664,066, filed on May 19, 2022, now Pat. No. 11,761,375.
(Continued)

(51) Int. Cl.
| | | |
|---|---|---|
| *F02B 43/12* | (2006.01) | |
| *C25B 1/04* | (2021.01) | |
| *F01N 3/02* | (2006.01) | |
| *F01N 5/02* | (2006.01) | |
| *H01M 8/04014* | (2016.01) | |

(Continued)

(52) U.S. Cl.
CPC ............. *F02B 43/12* (2013.01); *C25B 1/04* (2013.01); *F01N 3/0205* (2013.01); *F01N 5/02* (2013.01); *H01M 8/04014* (2013.01); *H01M 8/04089* (2013.01); *H01M 8/0656* (2013.01); *F02B 2201/04* (2013.01)

(58) Field of Classification Search
CPC .... Y02T 10/12; Y02T 10/30; F02B 2043/106; F02B 43/00; F02B 3/06; F02B 2275/14; F02B 69/04; F02M 21/0206; F02M 21/0221; F02M 21/0245; F02D 19/0671; F02D 19/024; Y02E 60/36; Y02E 60/32; Y10S 123/12
See application file for complete search history.

(56) References Cited

U.S. PATENT DOCUMENTS 4,018,190 A * 4/1977 Henault .................. F02B 43/10
123/3
4,178,987 A 12/1979 Bowman et al.
(Continued)

FOREIGN PATENT DOCUMENTS

AU 2017229114 B2 1/2023
AU 2023202266 A1 5/2023
(Continued)

OTHER PUBLICATIONS

International Search Report and Written Opinion for PCT Application No. PCT/US2022/072421, dated Aug. 25, 2022, 7 pages.
(Continued)

*Primary Examiner* — Lindsay M Low
*Assistant Examiner* — Teuta B Holbrook
(74) *Attorney, Agent, or Firm* — Abel Schillinger, LLP

(57) ABSTRACT

Various embodiments for a hydrogen zero emissions vehicle that utilizes hydride storage of hydrogen and buffering of hydrogen for high demand power are disclosed.

19 Claims, 1 Drawing Sheet

Related U.S. Application Data

(60) Provisional application No. 63/219,554, filed on Jul. 8, 2021, provisional application No. 63/191,270, filed on May 20, 2021, provisional application No. 63/191,273, filed on May 20, 2021, provisional application No. 63/191,279, filed on May 20, 2021, provisional application No. 63/191,215, filed on May 20, 2021.

(51) Int. Cl.
    *H01M 8/04089*      (2016.01)
    *H01M 8/0656*      (2016.01)

(56) References Cited

U.S. PATENT DOCUMENTS

| | | |
|---|---|---|
| 4,464,444 A | 8/1984 | Mikawa |
| 4,508,064 A * | 4/1985 | Watanabe ............... F02C 3/305 123/DIG. 12 |
| 5,067,447 A | 11/1991 | Iwaki et al. |
| 5,512,145 A | 4/1996 | Hollenberg |
| 6,821,663 B2 | 11/2004 | McElroy et al. |
| 6,838,203 B2 | 1/2005 | Zheng |
| 7,363,965 B2 | 4/2008 | Myasnikov et al. |
| 7,565,224 B2 | 7/2009 | Fairlie et al. |
| 7,691,502 B2 | 4/2010 | Wallace et al. |
| 7,861,696 B2 | 1/2011 | Lund |
| 8,186,315 B2 | 5/2012 | Jeffs et al. |
| 8,277,995 B2 | 10/2012 | Kim et al. |
| 8,336,508 B2 | 12/2012 | Huttner |
| 8,349,523 B2 | 1/2013 | Kotera et al. |
| 8,424,496 B2 | 4/2013 | Pursifull |
| 8,721,868 B2 | 5/2014 | Kelly et al. |
| 8,803,344 B2 | 8/2014 | Kyriakides et al. |
| 9,038,595 B2 | 5/2015 | Paul |
| 9,267,428 B2 | 2/2016 | Jonson et al. |
| 9,340,881 B2 | 5/2016 | Packer |
| 9,567,918 B2 | 2/2017 | Kjar et al. |
| 9,624,801 B2 | 4/2017 | Paul |
| 9,664,139 B2 | 5/2017 | Paul |
| 9,716,285 B2 | 7/2017 | Gummalla et al. |
| 9,771,658 B2 | 9/2017 | Haring |
| 10,236,528 B2 | 3/2019 | Jakus et al. |
| 10,305,130 B2 | 5/2019 | Yasukagawa |
| 10,494,992 B2 | 12/2019 | Johnson et al. |
| 10,605,162 B2 | 3/2020 | Johnson et al. |
| 10,619,562 B2 | 4/2020 | Johnson et al. |
| 10,746,094 B2 | 8/2020 | Johnson et al. |
| 11,280,261 B2 | 3/2022 | Johnson et al. |
| 11,415,088 B1 | 8/2022 | Jonson |
| 11,761,375 B2 | 9/2023 | Johnson et al. |
| 11,808,239 B2 | 11/2023 | Jonson |
| 11,815,011 B2 | 11/2023 | Johnson et al. |
| 11,828,219 B2 | 11/2023 | Johnson et al. |
| 11,879,402 B2 | 1/2024 | Jonson et al. |
| 11,897,768 B2 | 2/2024 | Ashton et al. |
| 2002/0179454 A1 | 12/2002 | Ross |
| 2003/0235738 A1 | 12/2003 | Zheng |
| 2004/0035401 A1 * | 2/2004 | Ramachandran ....... F02B 43/10 123/527 |
| 2004/0126641 A1 | 7/2004 | Pearson et al. |
| 2007/0028905 A1 * | 2/2007 | Shinagawa ............... C01B 3/26 123/575 |
| 2008/0138675 A1 | 6/2008 | Jang et al. |
| 2009/0169962 A1 | 7/2009 | Hsing et al. |
| 2009/0261186 A1 | 10/2009 | Fink et al. |
| 2011/0100328 A1 | 5/2011 | Paul |
| 2011/0159394 A1 | 6/2011 | Matsumoto |
| 2011/0174242 A1 | 7/2011 | McConahay et al. |
| 2012/0037098 A1 * | 2/2012 | Wey .................. F02B 51/06 123/3 |
| 2012/0255518 A1 | 10/2012 | Paul |
| 2012/0285428 A1 | 11/2012 | Kuroki et al. |
| 2013/0037003 A1 | 2/2013 | Sheerin |
| 2013/0220240 A1 | 8/2013 | Jonson et al. |
| 2013/0337351 A1 | 12/2013 | Drzal et al. |
| 2015/0040844 A1 | 2/2015 | Goldman et al. |
| 2016/0138496 A1 | 5/2016 | Jonson et al. |
| 2016/0305372 A1 | 10/2016 | Low |
| 2016/0341085 A1 | 11/2016 | Paul |
| 2017/0009702 A1 | 1/2017 | Paul |
| 2017/0244124 A1 | 8/2017 | Park et al. |
| 2017/0254259 A1 | 9/2017 | Johnson et al. |
| 2018/0320584 A1 | 11/2018 | Johnson et al. |
| 2018/0320585 A1 | 11/2018 | Johnson et al. |
| 2018/0320586 A1 | 11/2018 | Johnson et al. |
| 2019/0006686 A1 | 1/2019 | Carralero et al. |
| 2019/0097241 A1 | 3/2019 | Weber et al. |
| 2019/0233951 A1 | 8/2019 | Johnson et al. |
| 2019/0233956 A1 | 8/2019 | Johnson et al. |
| 2019/0234267 A1 | 8/2019 | Johnson et al. |
| 2019/0234297 A1 | 8/2019 | Johnson et al. |
| 2019/0234298 A1 | 8/2019 | Johnson et al. |
| 2019/0234322 A1 | 8/2019 | Johnson et al. |
| 2019/0234339 A1 | 8/2019 | Johnson et al. |
| 2019/0234346 A1 | 8/2019 | Johnson et al. |
| 2019/0234348 A1 | 8/2019 | Johnson et al. |
| 2019/0245224 A1 | 8/2019 | Lacroix et al. |
| 2020/0017982 A1 | 1/2020 | Lin |
| 2020/0066474 A1 | 2/2020 | Lorr et al. |
| 2020/0144647 A1 | 5/2020 | Hall et al. |
| 2020/0287230 A1 | 9/2020 | Lee et al. |
| 2020/0294779 A1 | 9/2020 | Ashton et al. |
| 2020/0294780 A1 | 9/2020 | Ashton et al. |
| 2020/0343733 A1 | 10/2020 | Crawford |
| 2020/0381757 A1 * | 12/2020 | Jia ................... H01M 8/04201 |
| 2022/0333561 A1 | 10/2022 | Jonson |
| 2022/0341361 A1 | 10/2022 | Johnson et al. |
| 2022/0372909 A1 | 11/2022 | Johnson et al. |
| 2022/0372935 A1 | 11/2022 | Johnson et al. |
| 2022/0376272 A1 | 11/2022 | Johnson et al. |
| 2022/0376284 A1 | 11/2022 | Johnson et al. |
| 2022/0380218 A1 | 12/2022 | Johnson et al. |
| 2023/0052188 A1 | 2/2023 | Johnson et al. |
| 2023/0062236 A1 | 3/2023 | Johnson et al. |
| 2023/0084345 A1 | 3/2023 | Johnson et al. |
| 2023/0109645 A1 | 4/2023 | Stowell et al. |
| 2024/0077016 A1 | 3/2024 | Johnson et al. |

FOREIGN PATENT DOCUMENTS

| | | |
|---|---|---|
| CA | 3016456 A1 | 9/2017 |
| CA | 3094556 A1 | 8/2019 |
| CA | 2865426 C | 7/2020 |
| CN | 102052205 A | 5/2011 |
| CN | 104454246 A | 3/2015 |
| CN | 105673199 A | 6/2016 |
| CN | 106837529 A | 6/2017 |
| CN | 109477425 A | 3/2019 |
| CN | 111006124 | 4/2020 |
| CN | 108547710 B | 9/2020 |
| DE | 102017116648 A1 | 1/2019 |
| DE | 102017214960 A1 * | 2/2019 |
| EP | 1284515 A3 | 8/2004 |
| EP | 1397583 B1 | 10/2007 |
| EP | 2820286 B1 | 7/2018 |
| IN | 201847035777 A | 10/2018 |
| JP | H06336934 A * | 12/1994 |
| JP | 2003164063 A | 6/2003 |
| JP | 2004206950 A * | 7/2004 |
| JP | 2012156033 A * | 8/2012 |
| JP | 2016070301 A | 5/2016 |
| JP | 2018106957 A | 7/2018 |
| JP | 2019061792 A | 4/2019 |
| JP | 2020032697 A | 3/2020 |
| JP | 2022174084 A | 11/2022 |
| KR | 10-1683744 A | 9/2016 |
| KR | 20180122820 A | 11/2018 |
| KR | 20200097670 A | 8/2020 |
| NZ | 530424 A | 10/2006 |
| NZ | 549815 A | 2/2008 |
| WO | 1996008048 A1 | 3/1996 |
| WO | 2002099260 A1 | 12/2002 |

(56) References Cited

FOREIGN PATENT DOCUMENTS

| | | | |
|---|---|---|---|
| WO | 2013130467 | A1 | 9/2013 |
| WO | 2015042520 | A1 | 3/2015 |
| WO | 2017155895 | A1 | 9/2017 |
| WO | 2019119062 | A1 | 6/2019 |
| WO | 2019147849 | A1 | 8/2019 |
| WO | 2020007491 | A1 | 1/2020 |
| WO | 2021005344 | A1 | 1/2021 |
| WO | 2021042352 | A1 | 3/2021 |
| WO | 2022246440 | A1 | 11/2022 |
| WO | 2022246441 | A1 | 11/2022 |
| WO | 2022246442 | A1 | 11/2022 |
| WO | 2022246443 | A1 | 11/2022 |
| ZA | 200400005 | B | 3/2006 |

OTHER PUBLICATIONS

"Effect of hydrogen supplementation in different types of engines," Controllers for Hydrogen HHO: EFIE, MAP, IAT, constant current PWM, Better Fuel Technology, retrieved Feb. 16, 2024, 6 pages, <https://www.hho-1.com/hydrogen-hho-controller-tuning/>.

"Revolutionizing Thermal Efficiency in the Built Environment," NanoTech Materials—Cool Roof, Insulative, and Fireproof Coatings, Breakthrough Solutions, retrieved Feb. 29, 2024, 12 pages, <https://nanotechmaterials.com/>.

"Researchers develop bi-metallic catalyst for thermocatalytic decomposition of methane: H2 with low or no CO2," Green Car Congress, dated Mar. 19, 2021, 9 pages, <https://www.greencarcongress.com/2021/03/20210319-tcd.html>.

"The Addition of Fractional Amounts of Hydrogen to Promote Reduced Emissions and Decreased Fuel Consumption in Diesel Engines," Presentation to the Mining Emissions Conference, Oct. 2005, Hydrogen Fuel Injection Canadian Hydrogen Energy Company Ltd., 6 pages.

"New Clean Energy Process ConvertsMethane to Hydrogen with ZeroCarbon Dioxide Emissions," Pacific Northwest National Laboratory, dated Mar. 18, 2021, 13 pages, <https://www.pnnl.gov/news-media/new-clean-energy-process-converts-methane-hydrogen-zero-carbon-dioxide-emissions>.

Musamali, Ronald et al., "Decomposition of Methan to Carbon and Hydrogen: A Catalytic Perspective," Energy Technol. 2019, 7, 1800593, 16 pages.

Kim, Yong Seung et al., "Methane as an effective hydrogen source for single-layer graphene synthesis on Cu foil by plasma enhanced chemical vapor deposition," 27 pages.

Zhakeyev, Adilet et al., "Additive Manufacturing: Unlocking the Evolution of Energy Materials," Advanced Science, vol. 4, Issue 10, published Jul. 25, 2017, 115 pages.

"Hydrogen Solutions, Learn more about Hydrogen," ALTA Material Handling, 2024, 4 pages <https://materialhandling.altaequipment.com/emerging-technologies/>.

Pasini, Jose Miguel et al., "Metal hydride material requirements for automotive hydrogen storage systems," Elsevier, Jul. 22, 2013, 11 pages.

Blain, Loz, "World-first home hydrogen battery stores 3x the energy of a Powerwall 2," New Atlas, dated Jan. 22, 2021, 15 pages, <https://newatlas.com/energy/lavo-home-hydrogen-battery-storage/>.

O'Neil, Sean, "Unlocking the Potential of Hydrogen Energy Storage," Fuel Cell & Hydrogen Energy Association, Jul. 22, 2019, 3 pages, <https://www.fchea.org/transitions/2019/7/22/unlocking-the-potential-of-hydrogen-energy-storage>.

International Search Report and Written Opinion for PCT Application No. PCT/US2022/072420, dated Sep. 5, 2022, 10 pages.

Zarybnicka, Lucie et al., "Preparation of Cation Exchange Filament for 3D Membrane Print," Rapid Prototyping Journal, published Jul. 9, 2020, vol. 26, No. 8, pp. 1435-1445.

International Search Report and Written Opinion for PCT Application No. PCT/US2022/072423, dated Sep. 5, 2022, 9 pages.

International Search Report and Written Opinion for PCT Application No. PCT/US2022/072424, dated Sep. 6, 2022, 9 pages.

International Search Report and Written Opinion for PCT Application No. PCT/US2022/072427, dated Aug. 31, 2022, 9 pages.

International Preliminary Report on Patentability for PCT Application No. PCT/US2022/072420, dated Nov. 30, 2023, 8 pages.

International Preliminary Report on Patentability for PCT Application No. PCT/US2022/072421, dated Nov. 30, 2023, 6 pages.

International Preliminary Report on Patentability for PCT Application No. PCT/US2022/072423, dated Nov. 30, 2023, 7 pages.

International Preliminary Report on Patentability for PCT Application No. PCT/US2022/072424, dated Nov. 30, 2023, 7 pages.

International Preliminary Report on Patentability for PCT Application No. PCT/US2022/072427, dated Nov. 30, 2023, 8 pages.

Zhang, Z et al., "Continuous operation in an electric and hydrogen hybrid energy storage system for renewable power generation and autonomous emergency power supply," International Journal of Hydrogen Energy, vol. 44, Issue 41, Aug. 30, 2019, pp. 23384-23395.

Endo, Naruki et al., "Construction and operation of hydrogen energy utilization system for a zero emission building," International Journal of Hydrogen Energy, vol. 44, Issue 29, Jun. 7, 2019, pp. 14596-14604.

Khayrullina, Aliya et al., "Novel kW scale hydrogen energy storage system utilizing fuel cell exhaust air for hydrogen desorption process from metal hydride reactor," Energy, vol. 183, Sep. 15, 2019, pp. 1244-1252.

Klingele, Matthias et al., "Direct deposition of proton exchange membranes enabling high performance hydrogen fuel cells," J. Mater. Chem. A, 2015, 3, pp. 11239-11245.

\* cited by examiner

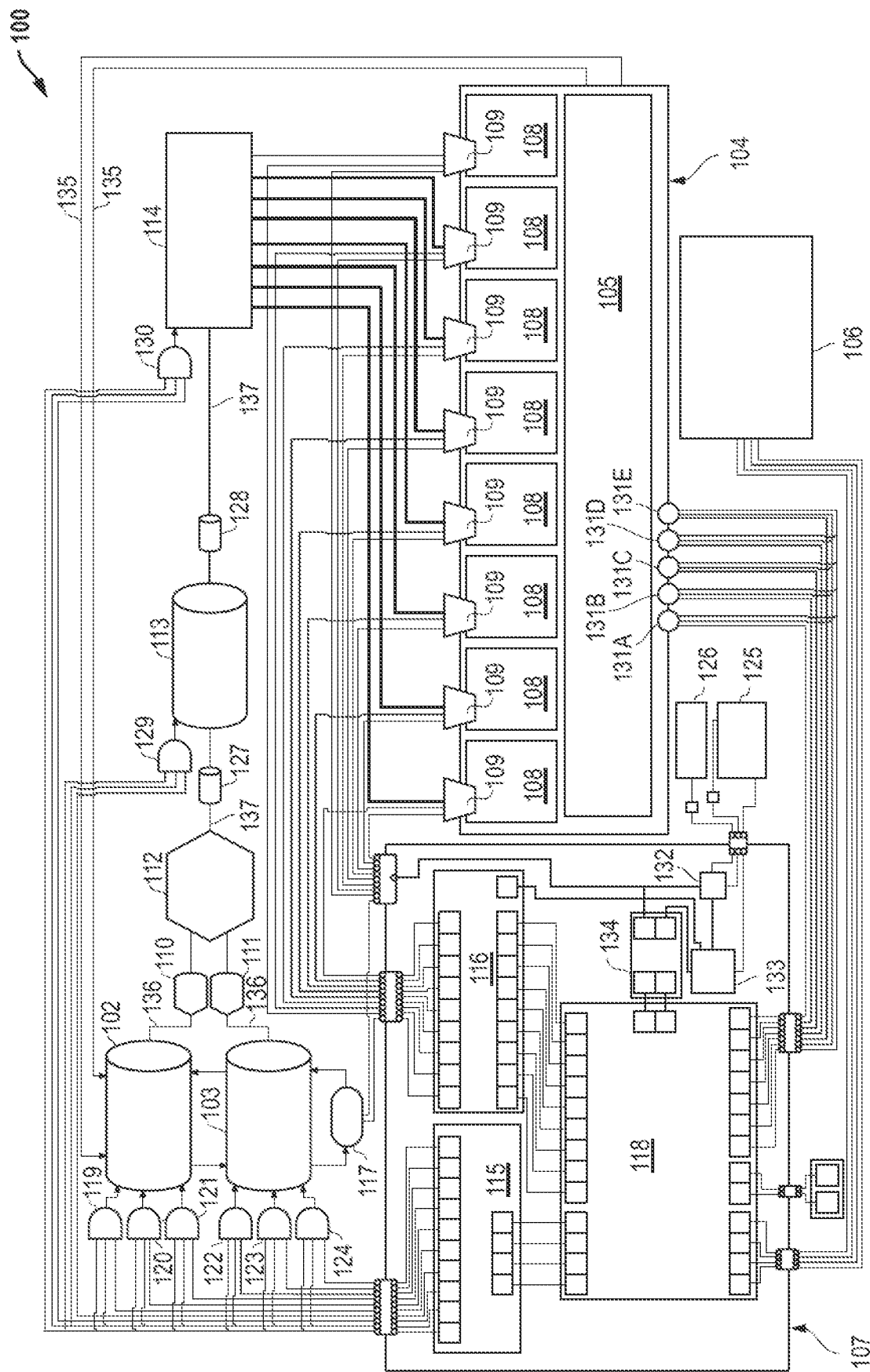

SYSTEMS AND METHODS FOR A HYDROGEN ZERO EMISSIONS VEHICLE

CROSS-REFERENCE TO RELATED APPLICATION(S)

This Application is a continuation of and claims priority under 35 U.S.C. § 120 to U.S. patent application Ser. No. 17/664,066, entitled "SYSTEMS AND METHODS FOR A HYDROGEN ZERO EMISSIONS VEHICLE," by Evan Johnson et al., filed May 19, 2022, which claims priority under 35 U.S.C. § 119(e) to U.S. Provisional Patent Application No. 63/191,270, entitled "SYSTEMS AND METHODS FOR A HYDROGEN ZERO EMISSIONS VEHICLE," by Evan Johnson et al., filed May 20, 2021, and claims priority under 35 U.S.C. § 119(e) to U.S. Provisional Patent Application No. 63/191,273, entitled "SYSTEMS AND METHODS FOR HYDROGEN ENERGY PRODUCTION AND STORAGE," by Evan Johnson et al., filed May 20, 2021, and claims priority under 35 U.S.C. § 119(e) to U.S. Provisional Patent Application No. 63/191,215, entitled "SYSTEMS AND METHODS HYDROGEN ENERGY FUEL CELL AND ELECTROLYZER," by Evan Johnson et al., filed May 20, 2021, and claims priority under 35 U.S.C. § 119(e) to U.S. Provisional Patent Application No. 63/191,279, entitled "SYSTEMS AND METHODS FOR A HYDROGEN ENERGY STORAGE HYDRIDE TANK," by Evan Johnson et al., filed May 20, 2021, and claims priority under 35 U.S.C. § 119(e) to U.S. Provisional Patent Application No. 63/219,554, entitled "SYSTEMS AND METHODS FOR HYDROGEN ENERGY PRODUCTION AND STORAGE," by Evan Johnson et al., filed Jul. 8, 2021, all of which are assigned to the current assignee hereof and incorporated herein by reference in their entireties.

FIELD OF THE DISCLOSURE

The present disclosure generally relates a zero emissions vehicle, and in particular to a hydrogen zero emissions vehicle that utilizes hydride storage of hydrogen and buffering of hydrogen for high demand power.

BACKGROUND

The drawbacks of hydrogen use for vehicle fuel are high capital cost, lower energy content per unit of volume, high tankage weights, and high storage vessel pressure. In addition, the issues related to storage, transportation and filling of gaseous or liquid hydrogen in vehicles poses technical hurdles. A large investment in infrastructure would also be required to fuel such vehicles in view of the large production processes and technical hurdles involved.

It is with these observations in mind, among others, that various aspects of the present disclosure were conceived and developed.

BRIEF DESCRIPTION OF THE DRAWINGS

FIG. 1 is a schematic illustration showing the various components of the hydrogen zero emissions vehicle.

Corresponding reference characters indicate corresponding elements among the view of the drawings. The headings used in the FIGURES do not limit the scope of the claims.

REFERENCE NUMBERS

100. Hydrogen Zero Emissions Vehicle
102. First Hydride Storage Tank
103. Second Hydride Storage Tank
104. Engine
105. Coolant System
106. User Interface
107. Hydrogen Control Module
108. Plurality of Cylinders
109. Plurality of Injectors
110. First Gas Regulator
111. Second Gas Regulator
112. Collector
113. Hydrogen Buffer Tank
114. Hydrogen Manifold
115. Analog-to-Digital Converter
116. Driver
117. Pump
118. Controller
119. First Thermometer
120. First Pressure Sensor
121. First Level Sensor
122. Second Thermometer
123. Second Pressure Sensor
124. Second Level Sensor
125. 12V Source
126. 12V Ignition Source
127. First Flash Arrestor
128. Second Flash Arrestor
129. Hydrogen Buffer Tank Pressure Sensor
130. Hydrogen Manifold Pressure Sensor
131A-E. Plurality of Engine Sensors
132. Ignition Relay
133. 0V Bus Bar
134. 12V-5V Converter
135. Coolant Lines
136. Gas Lines

DETAILED DESCRIPTION

Various embodiments of a hydrogen zero emissions vehicle that uses hydride storage and buffering of hydrogen to provide high demand power is disclosed herein. The hydrogen zero emissions vehicle takes advantage of low pressure hydride tanks in conjunction with a high pressured "pre-buffer" tank and an efficient injection system for providing a high demand driving functionality. In one aspect, the hydrogen zero emissions vehicle focuses on adding thermal dilution and programming variable injection to optimize combustion and reducing emissions of the combustion engine. In another aspect, the system used for the hydrogen zero emissions vehicle allows for on-demand speed and required power and is designed to be retrofitted to an extension vehicle or engine applications. Embodiments of the hydrogen zero emissions vehicle are disclosed and generally indicated as 100 in FIG. 1.

Referring to FIG. 1, the hydrogen zero emissions vehicle 100 (hereinafter referred to the "vehicle") includes a combustion engine 104 for powering the vehicle 100. In some embodiments, the combustion engine 104 may have a plurality of cylinders 108, for example eight cylinders, with each respective cylinder 108 in association with a respective cylinder injector 109 which is connected to a hydrogen line from the hydrogen manifold 114 for providing hydrogen to the combustion engine 104. The plurality of cylinder injectors 109 directly inject hydrogen into the combustion engine 104 for combustion events, thereby allowing for cleaner and more powerful burns. As shown, each cylinder injector 109 is operatively connected to an ignition relay 132, through a C3 connector, the driver 116, through the C2 connector, and the hydrogen manifold 114 through the hydrogen supply line.

The 12V wire to the each respective cylinder injector 109 is "hot" when the ignition is ON. As shown, the ground wire is connected when the driver 116 closes to connection with ground through the 0V Bus Bar 133 that form a part of the hydrogen control module 107. A user interface 106 is in operative communication with the hydrogen control module 107 for displaying critical information to the user and allow the user to control specific aspects of the display and operational parameters. When the ignition is ON, the 12V wire will be "hot" and "close" the ignition relay 132, thereby connecting the 12V to 5V converter 134 and the cylinder injectors 108 to the positive side of the 12V source 125. In some embodiments, the 12V source 125 is a battery that provides power to the hydrogen control module 107. As shown, the positive side of the 12V source 125 is connected to the ignition relay 132 through the C7 connector, while the negative side (ground of the vehicle) in connected to the 0V bus bar 133 through the C7 connector. The ignition relay 132 acts a switch connecting the hydrogen control module 107 to a source of power.

In one aspect, the coolant system 105 of the combustion engine 104 includes coolant lines 135 having a connection that allows for the heat of the combustion engine 104 to be used to control the temperature of the hydride tanks. This arrangement allows the controller 118 of the hydrogen control module 107 to regulate the temperature of the first and second hydride tanks 102 and 103 through pump 117.

The first and second hydride tanks 102 and 103 are used for stable long term storage of hydrogen. In some embodiments, each of the first and second hydride tanks 102 and 102 has an inner metallic layer and an outer carbon/graphene fiber layer with a vacuum insulation between the two layers. Two types of temperature regulation methods are utilized: (1) metallic pipes that carry coolant from the combustion engine 104 to allow excess heat from the combustion event to be used to maintain a high efficiency temperature; and (2) an electronic heating coil that is controlled by the controller 118 and is turned ON when the engine coolant does not provide sufficient heat to maintain the most efficient hydride tank temperature.

As shown, the first hydride tank 102 includes a pressure sensor 120 and the second hydride tank 103 includes a pressure sensor 123 for detecting the pressure within the first and second hydride tanks 102 and 103, respectively. In addition, the first hydride tank 102 includes a thermometer 119 for detecting the current temperature and a level sensor 121 for detecting the current level of hydrogen in the first hydride tank 102. Similarly, the second hydride tank 103 includes a thermometer 122 for detecting the current temperature and a level sensor 124 for detecting the current level of hydrogen in the second hydride tank 103. A first gas regulator 110 connects a gas line from the first hydride tank 102 to the connector 112 and a second gas regulator 111 connects a gas line from the second hydride tank 103 to the connector 112. The pump 117 is operable for controlling the temperature within the first and second hydride tanks 102 and 103. The controller 112 consolidates all of the hydrogen gas lines 136 from the first and second hydride tanks 102 and 103 into one main hydrogen gas line 137.

In some embodiments, a flash arrestor 127 is in communication with the main gas line 137 between the collector 112 and the hydrogen buffer tank 113, while a second flash arrestor 128 is in communication with the main gas line 137 between the hydrogen buffer tank 113 and the hydrogen manifold 114 and act as a directional safety device to prevent a catastrophic explosion from reaching other parts of the vehicle 100.

In some embodiments, the hydrogen buffer tank 113 provides a storage tank for hydrogen gas supplied from the first and second hydride tanks 102 and 103 to allow for an increase in hydrogen demand. The hydrogen buffer tank 113 includes a pressure sensor 129 for informing the controller 118 of the current pressure inside the hydrogen buffer tank 113. In one arrangement, the pressure sensor 129 is operatively connected to the analog-to-digital converter 115 through the C1 connector.

In some embodiments, a hydrogen manifold 114 is in fluid flow communication with the hydrogen manifold take the intake from the hydrogen buffer tank 113 and diverts the main line into multiple lines that communicate with each cylinder injector 109.

In some embodiments, the analog-to digital converters take analog signals from the various sensors 120-124 operatively connected to the first and second hydride tanks 102 and 103 and communicates that information (temperature, pressure, level) to the controller 118.

In some embodiments, the driver 116 receives the 5V signal to connect the hydrogen injectors 109 to ground to allow the firing of each respective hydrogen injector 109. The driver 116 is connected to the controller 118, the 0V bus bar 133, the hydrogen injectors 109, through the C3 connector and the pump 117.

The controller 118 is an embedded system used to control the hydrogen control module 107 and is configured to receive input from the analog-to-digital receiver 115, the user interface 106, 12V to 5V converter 134, and The CAN High/CAN Low Inputs, and engine sensors 131A-131E, for example, cam sensor, crank sensor, map sensor, O2 sensors, and NOx sensors).

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A hydrogen zero emissions vehicle comprising: a combustion engine operable having a combustion chamber for generating a combustion event, the combustion engine having a plurality of cylinders and a plurality of injectors for injecting a hydrogen gas into the combustion chamber and a coolant system; a plurality of hydride tanks in fluid flow communication with a hydrogen buffer tank; a hydrogen manifold including gas lines for the transport of hydrogen gas; and a controller in operative communication with the plurality of injectors for controlling the variable injection operation of each of the plurality of injectors.

Embodiment 2. The vehicle of embodiment 1, further comprising: a user interface in operative communication with the controller for providing an information display and operations control.

Embodiment 3. The vehicle of embodiment 1, further comprising: a pump in fluid flow communication with the plurality of hydride tanks for controlling the flow of hydride between each of the plurality of hydride tanks.

Embodiment 4. The vehicle of embodiment 1, further comprising: a driver in operative communication with the controller for controlling the operation of the plurality of injectors.

Embodiment 5. The vehicle of embodiment 1, further comprising: a plurality of sensors in operative communication with each of the plurality of hydride tanks for detecting at least one of temperature, pressure and level within each of the plurality of hydride tanks.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A hydrogen zero emissions vehicle comprising:
an engine having a plurality of cylinders and a plurality of injectors for injecting a hydrogen gas into the engine;
at least one hydride tank configured for stable long term storage of hydrogen gas through temperature regulation,
a hydrogen buffer tank,
a hydrogen manifold, and
a controller,
wherein the at least one hydride tank is in fluid flow communication with and provides hydrogen gas to the hydrogen buffer tank;
wherein the hydrogen buffer tank is in fluid flow communication with and provides hydrogen gas to the hydrogen manifold;
wherein the hydrogen manifold comprises gas lines for the transport of hydrogen gas; and
wherein the controller is in operative communication with the plurality of injectors for controlling variable injection operation of each of the plurality of injectors.

2. The vehicle of claim 1, further comprising:
a user interface in operative communication with the controller for providing an information display and operations control.

3. The vehicle of claim 1, further comprising:
a pump in fluid flow communication with the at least one hydride tank for controlling the flow of hydrogen from the at least one hydride tank.

4. The vehicle of claim 1, further comprising:
a driver in operative communication with the controller for controlling the operation of the plurality of injectors.

5. The vehicle of claim 1, further comprising:
a plurality of sensors in operative communication with the at least one hydride tank for detecting at least one of temperature, pressure and level within the at least one hydride tank.

6. The vehicle of claim 1, wherein the at least one hydride tank comprises an inner metallic layer.

7. The vehicle of claim 6, wherein the at least one hydride tank further comprises an outer carbon based layer.

8. The vehicle of claim 7, wherein the at least one hydride tank further comprises a vacuum insulation between the inner metallic layer and the outer carbon based layer.

9. The vehicle of claim 1, wherein the at least one hydride tank comprises a pressure sensor for detecting the pressure within the at least one hydride tank.

10. The vehicle of claim 1, wherein the at least one hydride tank comprises a thermometer for detecting the temperature in the at least one hydride tank.

11. The vehicle of claim 1, wherein the at least one hydride tank comprises a level sensor for detecting the current level of hydrogen in the at least one hydride tank.

12. The vehicle of claim 1, wherein the hydrogen buffer tank comprises a pressure sensor for detecting the pressure within the at least one hydrogen buffer tank.

13. The vehicle of claim 1, wherein the hydrogen zero emissions vehicle comprises a first hydride tank and a second hydride tank.

14. The vehicle of claim 13, wherein the first hydride tank comprises an inner metallic layer and the second hydride tank comprises an inner metallic layer.

15. The vehicle of claim 13, wherein the first hydride tank comprises a pressure sensor for detecting the pressure within the first hydride tank and wherein the second hydride tank comprises a pressure sensor for detecting the pressure within the second hydride tank.

16. The vehicle of claim 13, wherein the first hydride tank comprises a thermometer for detecting the temperature within the first hydride tank and wherein the second hydride tank comprises a thermometer for detecting the temperature within the second hydride tank.

17. The vehicle of claim 13, wherein the first hydride tank comprises a level sensor for detecting the current level of hydrogen in the first hydride tank and wherein the second hydride tank comprises a level sensor for detecting the current level of hydrogen in the second hydride tank.

18. The vehicle of claim 14, wherein the first hydride tank further comprises an outer carbon based layer and the second hydride tank further comprises an outer carbon based layer.

19. The vehicle of claim 18, wherein the first hydride tank further comprises a vacuum insulation between the inner metallic layer and the outer carbon based layer and the second hydride tank further comprises a vacuum insulation between the inner metallic layer and the outer carbon based layer.

* * * * *